United States Patent [19]
Palandrani

[11] 4,223,965
[45] Sep. 23, 1980

[54] WALL CABINET
[75] Inventor: Joseph Palandrani, Rocky River, Ohio
[73] Assignee: American Metal Forming Company, Cleveland, Ohio
[21] Appl. No.: 939,202
[22] Filed: Sep. 5, 1978
[51] Int. Cl.² .................. A47B 81/00; A47B 43/00
[52] U.S. Cl. ............................ 312/100; 312/257 R; 312/257 SM; 312/245
[58] Field of Search ............ 312/245, 257 R, 257 SK, 312/257 A, 257 SM, 100, 264, 102, 296; 49/485

[56] References Cited
U.S. PATENT DOCUMENTS

| | | | |
|---|---|---|---|
| 459,697 | 9/1891 | Atkinson | 312/257 R |
| 1,222,451 | 4/1917 | Ohnstrand | 312/257 R |
| 1,379,228 | 5/1921 | Swift | 312/245 |
| 2,095,227 | 10/1937 | Brown | 312/245 |
| 2,149,114 | 2/1939 | Constantine | 312/296 |
| 2,274,106 | 2/1942 | Strong et al. | 312/100 |
| 2,884,296 | 4/1959 | Meilinger et al. | 312/257 R |
| 2,899,254 | 8/1959 | Latzko | 312/257 R |
| 2,932,545 | 4/1960 | Foley | 312/296 |
| 3,279,871 | 10/1966 | Bright | 312/296 |
| 3,365,535 | 1/1968 | Wilk | 312/100 |

Primary Examiner—Victor N. Sakran
Attorney, Agent, or Firm—Baldwin, Egan, Walling & Fetzer

[57] ABSTRACT

An enclosure is presented which is useful to house electrical controls where protection from oil, dust and water is required. The enclosure is made from sheet steel and is of generally rectangular shape and the parts forming the walls of the enclosure are constructed in such a manner that all welding of such enclosure parts occurs inside the enclosure.

1 Claim, 6 Drawing Figures

WALL CABINET

An object of this invention is to provide an oil-, dust- and water-proof enclosure of steel which comprises a generally rectangular box open at the front and composed of a single sheet of steel forming the back and two ends of the box together with two side wall panels having edge flanges which enter snugly into contact inside of the single sheet member in contact with the back and end walls and which are there secured firmly by welding, so that the final product has a clean outside surface with no welding visible or available for attack by a thief or the like.

Other objects and advantages of the invention will be apparent from the accompanying specification and drawings and the essential features thereof will be set forth in the appended claims.

In the drawings,

FIG. 5 is an enlarged fragmental sectional view taken along the line 5—5 of FIG. 4; while

The enclosure described herein consists of a box 10 open at the front and closed by a door 11 as shown in FIGS. 1 through 4.

Figure 2:
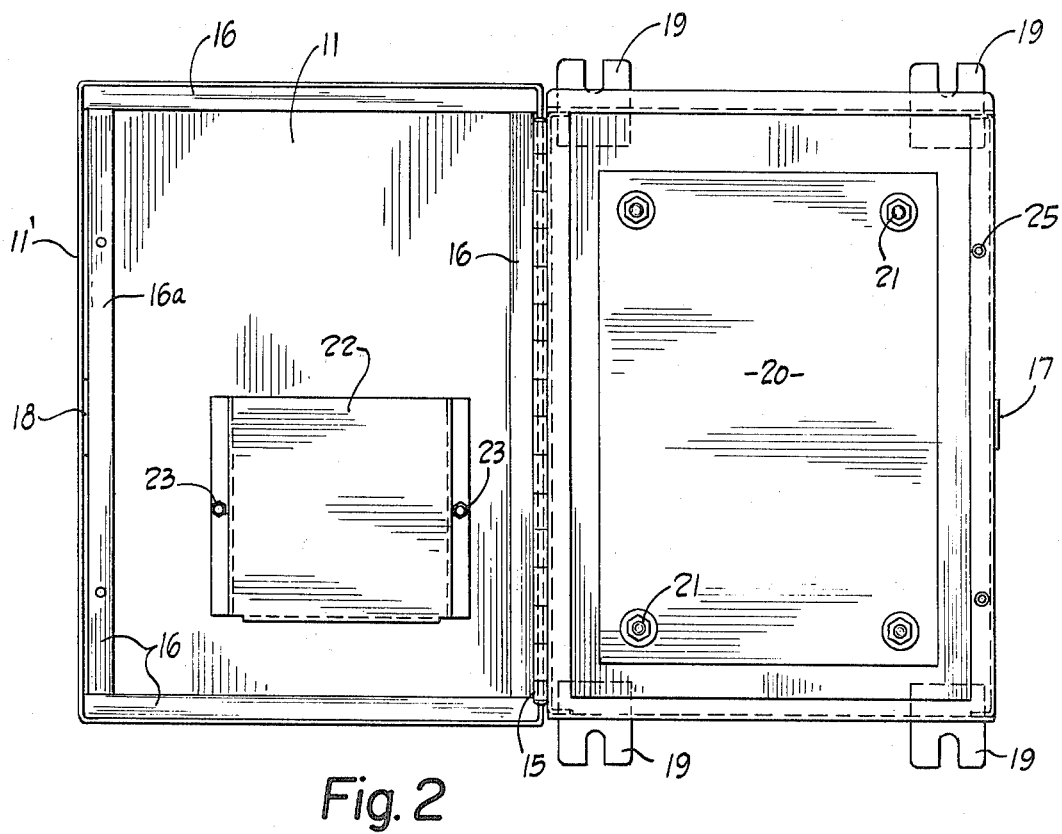
FIG. 2 is a view of the enclosure taken from the front thereof with the door open.
Figure 3:
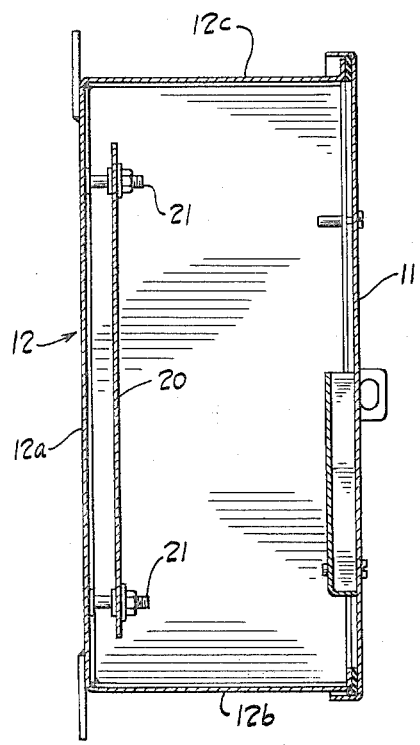
FIG. 3 is a sectional view of the same taken along the line 3—3 of FIG. 1.
Figure 6:
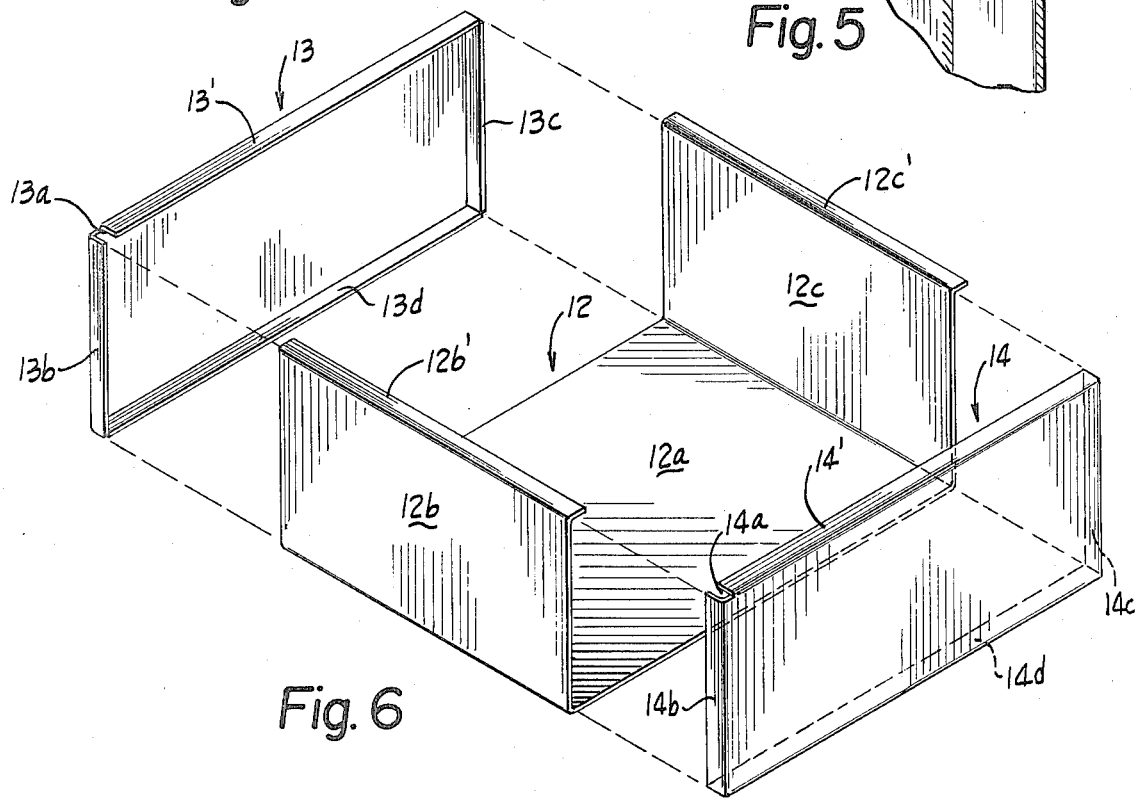
FIG. 6 is an exploded view showing a single sheet forming the back and two end walls of the enclosure together with two side wall members in position for assembly with the central single-sheet member.

The box is formed of a single sheet of steel plate 12 having a back wall 12a which is rectangular and having the opposite ends bent at right angles upwardly, as viewed in FIG. 6, to provide end walls 12b and 12c. The end wall 12b, which is the bottom wall as seen in FIGS. 2 and 3, has an end edge flange 12b' bent inwardly at right angles to the bottom wall at a predetermined distance from the back wall 12a. The other end wall 12c, here sometimes referred to as the top wall, has an end edge flange 12c' bent outwardly at right angles to the top wall at the same predetermined distance from the back wall.

Two side walls 13 and 14 are each composed of a single sheet of steel. Each side wall has a continuous edge flange 13' and 14' extending around the four edges of the rectangular side wall except for a slight space 13a and 14a at the upper front edge at the zone of the open front of the box. Each side wall has a width from front to back equal to the distance from the inner face of the back wall to the outer face of the edge flanges 12b' and 12c'. Each side wall has a length from top to bottom equal to the distance between the inner faces of the top wall 12c and the bottom wall 12b.

In assembling the parts from the position shown in exploded view in FIG. 6, the side walls 13 and 14 are moved into the generally C-shaped part 12 with the end flanges 13b and 13c fitting snugly on the inner faces of the walls 12b and 12c while the end flange portions 14b and 14c also fit snugly on the inner faces of the end wall portions 12b and 12c. At the same time the edge flange portion 13d fits snugly against the back wall 12a and the edge flange portion 13b also fits snugly against the back wall 12a. In this position of the parts all portions of the edge flanges 13b, 13c and 13d are welded against the back and end wall portions 12a, 12b and 12c. Also all of the edge flange portions 14b, 14c and 14d are welded against the contacting surfaces of back wall 12a and end walls 12b and 12c.

When the parts have been assembled as hereinabove described, the flanges 12b' and 12c' and also the uppermost flange portion of 13' and 14' are at the same level. At this time the flange 12b' fills in the spaces 13a and 14a which were previously described. Then these meeting flanges at the upper edge of the box, thus formed, are welded together at the upper corners of the box and all such welds are ground and polished to a smooth linear contour around the entire upper edge of the box.

A flat rectangular door 11 is then provided to close the open end of the box just described. This door has inturned edges 11' positioned to fit snugly over the edge flanges at the face of the box. A continuous hinge 15, in this embodiment a piano hinge, is provided permanently connecting one edge of the door 11 to one of the side walls, here the side wall 14, and extending along the entire side wall. A continuous resilient seal 16, in one embodiment of neoprene, is secured to the inner face of the door 11 in position to rest on all of the edge flanges at the face of the box when the door is closed. It will be noted that the strip 16a of the resilient seal near the final closing edge of the door against the box is slightly away from and parallel to the inturned edge 11' of the door along that edge. The purpose of this structure is to make sure to seal the means supplied for holding the door 11 tightly closed against the box in its final position. This structure is here shown as a hasp 17 welded to the side wall 14 and extending above the upper surface of the door 11, and there provided with an opening 17' where the hasp 17 passes upwardly through a suitable opening 18 which is a narror rectangular opening through the cover 11 at the proper point as indicated in FIG. 2. A padlock passed through the opening 17' will then hold the door 11 tightly against the box in the closed position of the door. Screws 24 hold the door closed. It will be noted that the box and door and the hinge are so constructed and arranged that the door holds the resilient seal 16 against the box when the door is in its closed position. At this time the portion of the resilient strip 16a running past the opening 18 fits snugly against the hasp 17 there.

Means is provided for mounting the completed enclosure on a suitable support. In the drawings this is shown as tongues 19 welded to the back of the wall 12a and extending outwardly beyond the end walls 12b and 12c to receive fastening screws or bolts extending into a supporting wall. It should be understood that other fastening means might be provided other than 17, 18 and other means for supporting the enclosure on a support than that shown at 19.

Figure 4:
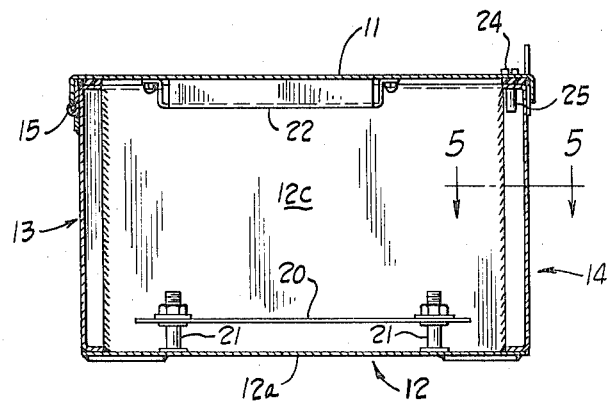
FIG. 4 is a sectional view of the same taken along the line 4—4 of FIG. 1.
Figure 5:
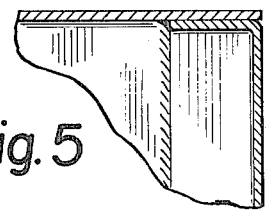

When the enclosure is to be used for electrical controls, a mounting panel 20 is mounted on bolts 21 supporting the panel rigidly spaced from the back wall 12a as clearly shown in FIGS. 2, 3 and 4.

If desired, a print or data pocket may be mounted on the inner face of the door 11 by suitable screws 23 as shown in FIG. 2.

It will be noted that the resilient sealing strip 16 is of neoprene about $\frac{1}{8}$ inch thick and $\frac{3}{8}$ inch wide. This might be substituted by any other suitable sealing strip.

The screws 24, of which two are used in this embodiment, are held in captive threaded sockets 25 inside the enclosure.

Figure 1:
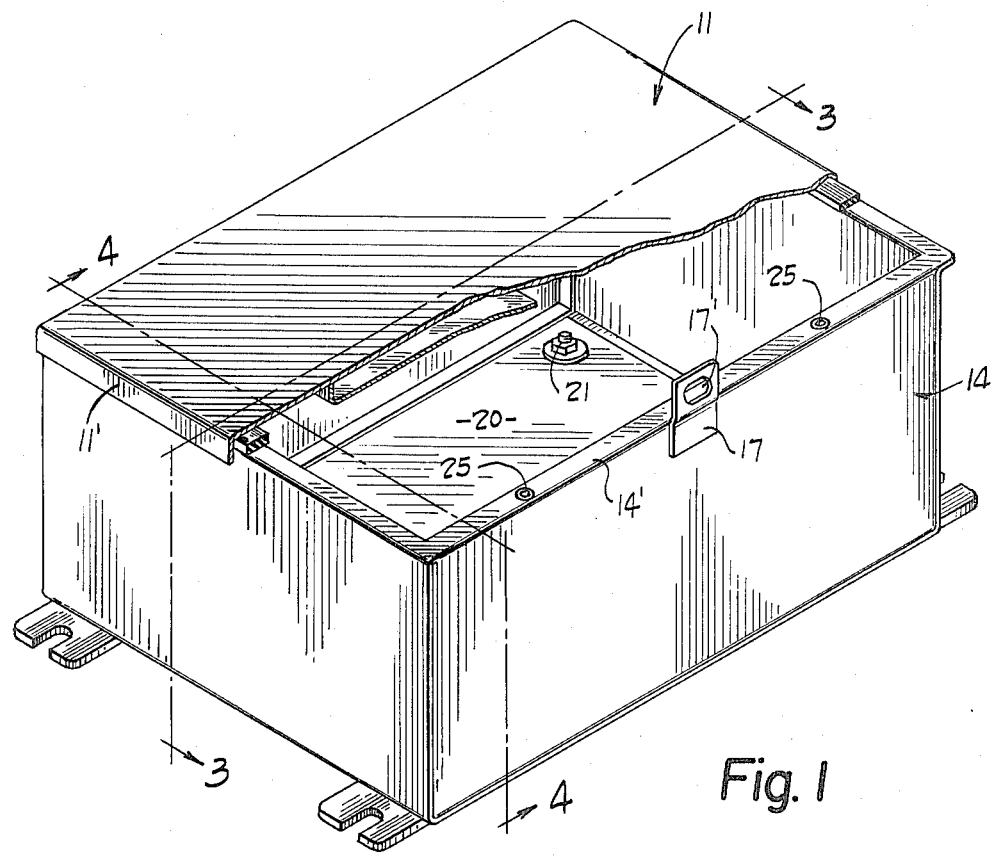
FIG. 1 is a perspective view of the complete enclosure with a portion of the door cut away to more clearly establish the construction within the enclosure.

It will be noted in FIG. 1 that the appearance of the completed enclosure using the construction of this invention is very smooth and clean, not marred by visible welds. This not only gives a pleasing appearance to the finished product but makes it more difficult to obtain access to the contents of the enclosure other than by using a key to open the hasp 17.

What is claimed is:

1. An oil-, dust- and waterproof enclosure of steel consisting of a box comprising a single retangular sheet bent at right angles at each end providing a bottom wall at one end and a top wall at the other end and a back wall between the top and bottom walls, said bottom wall having an end edge flange bent inwardly at right angles a predetermined distance from said back wall, said top wall having an end edge flange bent outwardly at right angles at the same predetermined distance from said back wall, two rectangular side walls composed of a single sheet for each, each side wall having a continuous planar edge flange aroung its four edges except for a slight space at the uppr front edge at the zone of the open front, each side wall having a width from front to back equal to the distance from the inner face of the back wall to the outer face of said first named end edge flanges, each side wall having a length from top to botom equal to the distance between the inner faces of said top wall and bottom wall, said side wall edge flanges being flat against and there welded to the inner faces of the contiguous top wall and bottom wall and back wall entirely on the inside of said enclosure, said side wall edge flanges being welded to said end edge flanges at their contact zones, said edge flanges at the face of said box spaced from said back wall being formed flat and coplanar, a flat rectangular door having inturned edges positioned to fit snugly over said edge flanges at said face of said box, a continuous hinge permanently connecting one edge of said door to one of said side walls along the entire side wall, a continuous resilient seal secured to the inner face of said door in position to rest on all of said edge flanges at said face of said box when said door is closed, said box and door and hinge being so constructed and arranged that said door holds said resilient seal firmly against said box when said door is closed, means for holding said door tightly against said box in closed position, and means for mounting said enclosure on a support.

* * * * *